(12) United States Patent
Sun

(10) Patent No.: US 11,548,146 B2
(45) Date of Patent: Jan. 10, 2023

(54) MACHINE LEARNING AND OBJECT SEARCHING METHOD AND DEVICE

(71) Applicant: HANGZHOU HIKVISION DIGITAL TECHNOLOGY CO., LTD., Hangzhou (CN)

(72) Inventor: Haiming Sun, Hangzhou (CN)

(73) Assignee: HANGZHOU HIKVISION DIGITAL TECHNOLOGY CO., LTD., Hangzhou (CN)

(*) Notice: Subject to any disclaimer, the term of this patent is extended or adjusted under 35 U.S.C. 154(b) by 411 days.

(21) Appl. No.: 16/632,510

(22) PCT Filed: Jul. 16, 2018

(86) PCT No.: PCT/CN2018/095769
§ 371 (c)(1),
(2) Date: Jan. 20, 2020

(87) PCT Pub. No.: WO2019/015544
PCT Pub. Date: Jan. 24, 2019

(65) Prior Publication Data
US 2020/0206918 A1 Jul. 2, 2020

(30) Foreign Application Priority Data
Jul. 20, 2017 (CN) .......................... 201710594689.9

(51) Int. Cl.
B25J 9/16 (2006.01)
G06N 20/00 (2019.01)
(Continued)

(52) U.S. Cl.
CPC ............ B25J 9/163 (2013.01); G06K 9/6262 (2013.01); G06N 20/00 (2019.01); G06V 20/20 (2022.01)

(58) Field of Classification Search
None
See application file for complete search history.

(56) References Cited

U.S. PATENT DOCUMENTS

| 2004/0103108 A1 | 5/2004 | Andreev et al. | |
| 2014/0121833 A1* | 5/2014 | Lee | B25J 9/1666 901/1 |

FOREIGN PATENT DOCUMENTS

| CN | 101537618 | 9/2009 |
| CN | 102609720 | 7/2012 |
| CN | 106926247 | 7/2017 |

OTHER PUBLICATIONS

Pecka, M., Svoboda, T. (2014). Safe Exploration Techniques for Reinforcement Learning—An Overview. In: Hodicky, J. (eds) Modelling and Simulation for Autonomous Systems. MESAS 2014. Lecture Notes in Computer Science, vol. 8906. Springer, Cham. https://doi.org/10.1007/978-3-319-13823-7_31 (Year: 2014).*

(Continued)

Primary Examiner — Chesiree A Walton
(74) Attorney, Agent, or Firm — Norton Rose Fulbright US LLP

(57) ABSTRACT

Machine learning object-searching methods and apparatuses are disclosed. The method comprises: selecting a state from a set of states of a target object-searching scene as a first state; obtaining a target optimal object-searching strategy whose initial state is the first state for searching for a target object; performing strategy learning by taking the target optimal object-searching strategy as a learning target to obtain an object-searching strategy by which a robot searches for the target object, and adding the obtained object-searching strategy into an object-searching strategy pool; determining whether the obtained object-searching strategy is consistent with the target optimal object-searching strategy; if yes, determining that the strategy learning in (Continued)

which the first state is taken as the initial state of the object-searching strategy is completed; and if not, returning to the step of selecting a state from a set of states of a target object-searching scene.

11 Claims, 4 Drawing Sheets

(51) Int. Cl.
    *G06K 9/62*         (2022.01)
    *G06V 20/20*      (2022.01)

(56) References Cited

OTHER PUBLICATIONS

Tai et al, "A robot exploration strategy based on Q-learning network," 2016 IEEE International Conference on Real-time Computing and Robotics (RCAR), 2016, pp. 57-62, doi: 10.1109/RCAR.2016.7784001. (Year: 2016).*

Zhuang et al, "Robot path planning in complex environment based on delayed-optimization reinforcement learning," Proceedings. International Conference on Machine Learning and Cybernetics, 2002, pp. 129-133 vol. 1, doi: 10.1109/ICMLC.2002.1176724. (Year: 2002).*

Lu et al, Efficient deep network for vision-based object detection in robotic applications, Neurocomputing, vol. 245, Jul. 5, 2017, p. 31-45 (Year: 2017).*

Tai et al., "Mobile robots exploration through cnn-based reinforcement learning," Robotics and Biomimetics, Dec. 21, 2016 (Year: 2016).*

Extended European Search Report issued in Corresponding European Application No. 18835074.8, dated Jun. 22, 2020.

Pecka et al., "Safe Exploration Techniques for Reinforcement Learning—An Overview" Revised Selected Papers 2014, 357-375, https://link.springer.com/content/pdf/10.1007/978-3-319-13823-7.pdf. Accessed Nov. 18, 2019.

Van Otterlo et al., "Reinforcement Learning and Markov Decision Processes" 2011, 1-40, Retrieved from the Internet: URL:https://web.archive.org/web/20110410001706if_/http://www.ai.rug.nl:80/~mwiering/Intro_RLBOOK.pdf. Accessed Jun. 10, 2020.

Jie, Shao. *Research on Key Technologies for Multi-robot Path Planning Based on Learning Classifier System*. 2011. Nanjing University of Science & Technology, PhD dissertation (English Abstract Provided).

Office Action issued in Corresponding Chinese Application No. 201710594689.9, dated Mar. 30, 2020 (English Translation Provided).

International Search Report and Written Opinion issued in corresponding International Application No. PCT/CN2018/095769, dated Oct. 10, 2018 (English translation of International Search Report provided).

* cited by examiner

MACHINE LEARNING AND OBJECT SEARCHING METHOD AND DEVICE

CROSS-REFERENCE TO RELATED APPLICATIONS

The present application is a national phase under 35 U.S.C. § 371 of International Application No. PCT/CN2018/095769, filed Jul. 16, 2018, which claims priority to Chinese patent application No. 201710594689.9, filed with the China National Intellectual Property Administration on Jul. 20, 2017 and entitled "Machine learning method and apparatus and object searching method and apparatus", each of which are incorporated herein by reference in their entirety.

TECHNICAL FIELD

The present application relates to the field of artificial intelligence technology, in particular to a machine learning method and apparatus and an object searching method and apparatus.

BACKGROUND

With the rapid development of machine learning algorithms, robots employing machine learning algorithms have been developed rapidly. More and more robots with different characteristics are applied in people's daily life, which brings convenience to people's life.

A robot with an object-searching function in an application scene is taken as an example. At present, most robots search for an object by determining an object-searching path depending on positioning apparatuses provided therein and the digital map technology. Although in most cases the object can be searched for successfully by the above method, the positioning devices provided in the above robots cannot provide a sufficiently accurate result and thus the above method has a low success rate in many application scenes.

SUMMARY

The purpose of the embodiment of the present application is to provide a machine learning method and apparatus and an object-searching method and apparatus, so as to improve the success probability of searching for an object. Specifically, the technical solutions are as follows:

In a first aspect, an embodiment of the present application provides a machine learning method, which is applied to a robot. The method includes:

selecting a state from a set of states of a target object-searching scene as a first state, wherein the set of states is a set of states of the robot in the target object-searching scene;

obtaining a target optimal object-searching strategy whose initial state is the first state for searching for a target object, wherein the object-searching strategy includes: states successively experienced by the robot from the initial state of the object-searching strategy to a state that the target object is found, and an action performed by the robot in transitioning from each state to a next state;

performing strategy learning by taking the target optimal object-searching strategy as a learning target to obtain an object-searching strategy by which the robot searches for the target object in the target object-searching scene, and adding the obtained object-searching strategy into an object-searching strategy pool, wherein the obtained object-searching strategy is an object-searching strategy whose initial state is the first state and whose end state is a second state, wherein the second state is a state of the robot corresponding to a position of the target object in the target object-searching scene;

determining whether the obtained object-searching strategy is consistent with the target optimal object-searching strategy by comparing the obtained object-searching strategy and the target optimal object-searching strategy;

when the obtained object-searching strategy is consistent with the target optimal object-searching strategy, determining that the strategy learning in which the first state is taken as the initial state of the object-searching strategy is completed; and when the obtained object-searching strategy is not consistent with the target optimal object-searching strategy, returning to the step of selecting a state from a set of states of a target object-searching scene.

In an implementation of the present application, performing strategy learning by taking the target optimal object-searching strategy as a learning target to obtain an object-searching strategy by which the robot searches for the target object in the target object-searching scene comprises:

determining a reward function in a reinforcement learning algorithm for strategy learning through a target type of object-searching strategy by taking the target optimal object-searching strategy as a learning target, wherein the target type of object-searching strategy is an object-searching strategy for searching for the target object in the target object-searching pool; and performing the strategy learning based on the reward function, to obtain an object-searching strategy that maximizes an output value of a value function in the reinforcement learning algorithm as an object-searching strategy by which the robot searches for the target object in the target object-searching scene.

In an implementation of the present application, determining a reward function in a reinforcement learning algorithm for strategy learning through a target type of object-searching strategy by taking the target optimal object-searching strategy as a learning target comprises:

determining a reward function R that maximizes a value of the following expression as the reward function in the reinforcement learning algorithm for strategy learning:

$$\text{maximise}\left(\sum_{i=1}^{k} p(V_{\pi_d}(S_0) - V_{\pi_i}(S_0))\right) \text{ where,}$$

$$V_\pi = \sum_{m}^{M} \gamma^i R(S_m, \pi(S_m))$$

$$p(x) = \begin{cases} x, & x \geq 0 \\ 2x, & x < 0 \end{cases}$$

k represents the number of object-searching strategies for searching for the target object included in the object-searching strategy pool, i represents an identifier of each object-searching strategy for searching for the target object in the object-searching strategy pool, $\pi_i$ represents an object-searching strategy for searching for the target object, identified by i, in the object-searching strategy pool, $\pi_d$ represents the target optimal object-searching strategy, $S_0$ represents the first state, $V_\pi$ represents an output value of the value function of the reinforcement learning algorithm in the object-searching strategy $\pi$, M represents the number of states included in the object-searching strategy $\pi$, m represents an identifier of each of the states in the object-searching strategy π, t represents the number of state transitions in the object-searching strategy π, $\pi(S_m)$ represents an action performed by the robot in transitioning from a state $S_m$ to a next state in the object-searching strategy π, γ is a preset coefficient, 0<γ<1, and maximise( ) represents a function that returns the maximum value.

In an implementation of the present application, performing the strategy learning based on the reward function to obtain an object-searching strategy that maximizes an output value of a value function in the reinforcement learning algorithm comprises:

obtaining, through learning, object-searching strategies whose initial states are the first state and whose end states are the second state in a preset state transition manner;

calculating, according to the following expression, an output value of the value function of the reinforcement learning algorithm in each of the obtained object-searching strategies:

$$V_\pi = \sum_{m}^{M} \gamma^t R_e(S_m, \pi(S_m))$$

where $R_e$ represents a reward function in the reinforcement learning algorithm; and determining an object-searching strategy corresponding to a maximum output value among the calculated output values as an object-searching strategy that maximizes an output value of the value function of the reinforcement learning algorithm.

In an implementation of the present application, the next state of each state in the object-searching strategy and an action performed by the robot in transitioning from each state to the next state are determined by:

determining, according to probabilities of transitioning from a pre-transition state to other states pre-obtained in statistics, a post-transition state and an action performed by the robot in transitioning from the pre-transition state to the post-transition state, wherein the action belongs to a set of actions of the target object-searching scene, and the set of actions is performed by the robot in performing state transitions in the target object-searching scene.

In an implementation of the present application, the states in the set of states are obtained by:

collecting an information sequence of the target object-searching scene, wherein the information sequence is composed of information elements comprising video frames and/or audio frames;

determining whether the number of information elements that have not been selected in the information sequence is greater than a preset number;

when the number of information elements that have not been selected in the information sequence is greater than the preset number, selecting the preset number of information elements from the information elements that have not been selected in the information sequence to generate one state of the robot in the target object-searching scene as a third state;

determining whether the third state exists in the set of states;

when the third state does not exist in the set of states, adding the third state into the set of states, and returning to the step of determining whether the number of information elements that have not been selected in the information sequence is greater than a preset number; and when the third state exists in the set of states, directly returning to the step of determining whether the number of information elements that have not been selected in the information sequence is greater than a preset number.

In an implementation of the present application, the actions in the set of actions are obtained by:

obtaining an action sequence corresponding to the information sequence, wherein the action sequence is composed of action elements, and the action elements in the action sequence correspond to the information elements in the information sequence one to one;

determining whether the number of action elements that have not been selected in the action sequence is greater than the preset number;

when the number of action elements that have not been selected in the action sequence is greater than the preset number, selecting the preset number of action elements from the action elements that have not been selected in the action sequence, to generate one action of the robot in the target object-searching scene as a first action;

determining whether the first action exists in the set of actions;

when the first action does not exist in the set of actions, adding the first action into the set of actions, and returning to the step of determining whether the number of action elements that have not been selected in the action sequence is greater than the preset number; and when the first action exists in the set of actions, directly returning to perform the step of determining whether the number of action elements that have not been selected in the action sequence is greater than the preset number.

In a second aspect, an embodiment of the present application provides an object-searching method, which is applied to a robot. The method includes:

receiving an object-searching instruction for searching for a target object in a target object-searching scene;

obtaining a current state of the robot;

determining an action performed by the robot in transitioning from the current state to a next state, according to an object-searching strategy, including the current state, for searching for the target object in an object-searching strategy pool, wherein an object-searching strategy in the object-searching strategy pool is a strategy by which the robot searches for the target object in the target object-searching scene and which is obtained by performing strategy learning by taking an optimal object-searching strategy for searching for the target object as a learning target, and includes: states successively experienced by the robot from an initial state of the object-searching strategy to a state that the target object is found, and an action performed by the robot in transitioning from each state to a next state;

performing the determined action to realize a state transition, and determining whether the target object is found;

when the target object is not found, returning to the step of obtaining a current state of the robot until the target object is found.

In an implementation of the present application, determining an action performed by the robot in transitioning from the current state to a next state, according to an object-searching strategy, including the current state, for searching for the target object in an object-searching strategy pool comprises:

calculating, according to the following expression, output values of a value function of a preset reinforcement learning algorithm in object-searching strategies including the current state in the strategy pool:

$$V_\pi = \sum_{m=n}^{M} \gamma^x R_e(S_m, \pi(S_m))$$

where $V_\pi$ represents an output value of the value function of the reinforcement learning algorithm in the object-searching strategy $\pi$, M represents the number of states included in the object-searching strategy $\pi$, m represents an identifier of each of the states in the object-searching strategy $\pi$, n represents an identifier of the current state in the object-searching strategy $\pi$, x represents the number of state transitions from the current state to a strategy end state in the object-searching strategy $\pi$, $\pi(S_m)$ represents an action performed by the robot in transitioning from a state $S_m$ to a next state in the object-searching strategy $\pi$, $\gamma$ is a preset coefficient, $0<\gamma<1$, and $R_e$ represents a reward function in the reinforcement learning algorithm; and selecting an object-searching strategy corresponding to a maximum output value among the calculated output values as a target object-searching strategy; and determining an action performed by the robot in transitioning from the current state to a next state in the target object-searching strategy.

In an implementation of the present application, obtaining a current state of the robot comprises:

collecting an information sequence of the target object-searching scene, wherein the information sequence is composed of information elements comprising video frames and/or audio frames;

selecting a preset number of information elements from the information sequence;

determining whether a state matching the selected information elements exists in a pre-obtained set of states of the target object-searching scene, wherein the set of states is a set of states of the robot in the target object-searching scene; and when a state matching the selected information elements exists in the pre-obtained set of states, determining the state matching the selected information elements in the set of states as the current state of the robot.

In a third aspect, an embodiment of the present application provides a machine learning apparatus, which is applied to a robot. The apparatus includes:

a state selecting module, configured for selecting a state from a set of states of a target object-searching scene as a first state, wherein the set of states is a set of states of the robot in the target object-searching scene;

a strategy obtaining module, configured for obtaining a target optimal object-searching strategy whose initial state is the first state for searching for a target object, wherein the object-searching strategy includes: states successively experienced by the robot from the initial state of the object-searching strategy to a state that the target object is found, and an action performed by the robot in transitioning from each state to a next state;

a strategy learning module, configured for performing strategy learning by taking the target optimal object-searching strategy as a learning target to obtain an object-searching strategy by which the robot searches for the target object in the target object-searching scene, and adding the obtained object-searching strategy into an object-searching strategy pool, wherein the obtained object-searching strategy is an object-searching strategy whose initial state is the first state and whose end state is a second state, wherein the second state is a state of the robot corresponding to a position of the target object in the target object-searching scene;

a strategy comparing module, configured for determining whether the obtained object-searching strategy is consistent with the target optimal object-searching strategy by comparing the obtained object-searching strategy and the target optimal object-searching strategy; when the obtained object-searching strategy is consistent with the target optimal object-searching strategy, triggering a learning determining module; and when the obtained object-searching strategy is not consistent with the target optimal object-searching strategy, triggering the state selecting module; and the learning determining module, configured for determining that the strategy learning in which the first state is taken as the initial state of the object-searching strategy is completed.

In an implementation of the present application, the strategy learning module includes:

a reward function determining sub-module, configured for determining a reward function in a reinforcement learning algorithm for strategy learning through a target type of object-searching strategy by taking the target optimal object-searching strategy as a learning target, wherein the target type of object-searching strategy is an object-searching strategy for searching for the target object in the target object-searching pool;

a strategy obtaining sub-module, configured for performing the strategy learning based on the reward function, to obtain an object-searching strategy that maximizes an output value of a value function in the reinforcement learning algorithm as an object-searching strategy by which the robot searches for the target object in the target object-searching scene; and a strategy adding sub-module, configured for adding the obtained object-searching strategy into an object-searching strategy pool.

In an implementation of the present application, the reward function determining sub-module is specifically configured for determining a reward function R that maximizes a value of the following expression as the reward function in the reinforcement learning algorithm for strategy learning:

$$\text{maximise}\left(\sum_{i=1}^{k} p\bigl(V_{\pi_d}(S_0) - V_{\pi_i}(S_0)\bigr)\right) \text{ where}$$

$$V_\pi = \sum_{m}^{M} \gamma^j R(S_m, \pi(S_m))$$

$$p(x) = \begin{cases} x, & x \geq 0 \\ 2x, & x < 0 \end{cases}$$

k represents the number of object-searching strategies for searching for the target object included in the object-searching strategy pool, i represents an identifier of each object-searching strategy for searching for the target object in the object-searching strategy pool, $\pi_i$ represents an object-searching strategy for searching for the target object, identified by i, in the object-searching strategy pool, $\pi_d$ represents the target optimal object-searching strategy, $S_0$ represents the first state, $V_\pi$ represents an output value of the value function of the reinforcement learning algorithm in the object-searching strategy $\pi$, M represents the number of states included in the object-searching strategy $\pi$, m represents an identifier of each of the states in the object-searching strategy $\pi$, t represents the number of state transitions in the object-searching strategy $\pi$, $\pi(S_m)$ represents an action performed by the robot in transitioning from a state $S_m$ to a next state in the object-searching strategy π, γ is a preset coefficient, 0<γ<1, and maximise( ) represents a function that returns the maximum value.

In an implementation of the present application, the strategy learning sub-module includes:

a strategy learning unit, configured for obtaining, through learning, object-searching strategies whose initial states are the first state and whose end states are the second state in a preset state transition manner;

an output value calculating unit, configured for calculating, according to the following expression, an output value of the value function of the reinforcement learning algorithm in each of the obtained object-searching strategies:

$$V_\pi = \sum_m^M \gamma^t R_e(S_m, \pi(S_m))$$

where $R_e$ represents a reward function in the reinforcement learning algorithm;

a strategy determining unit, configured for determining an object-searching strategy corresponding to a maximum output value among the calculated output values as an object-searching strategy that maximizes an output value of the value function of the reinforcement learning algorithm; and a strategy adding unit, configured for adding the obtained object-searching strategy into the object-searching strategy pool.

In an implementation of the present application, a next state of each state and an action performed by the robot in transitioning from each state to a next state in the object-searching strategy are determined according to probabilities of transitioning from a pre-transition state to other states pre-obtained in statistics;

the action performed by the robot in transitioning from each state to a next state belongs to a set of actions of the target object-searching scene, wherein the set of actions is performed by the robot in performing state transitions in the target object-searching scene.

In an implementation of the present application, the learning apparatus further includes:

a state obtaining module, configured for obtaining a state in the set of states;

wherein the state obtaining module comprises:

a first sequence collecting sub-module, configured for collecting an information sequence of the target object-searching scene, wherein the information sequence is composed of information elements comprising video frames and/or audio frames;

a first element number judging sub-module, configured for determining whether the number of information elements that have not been selected in the information sequence is greater than a preset number; when the number of information elements that have not been selected in the information sequence is greater than the preset number, triggering a state generating sub-module;

the state generating sub-module, configured for selecting the preset number of information elements from the information elements that have not been selected in the information sequence to generate one state of the robot in the target object-searching scene as a third state;

a state judging sub-module, configured for determining whether the third state exists in the set of states; when the third state does not exist in the set of states, triggering a state adding sub-module; and when the third state exists in the set of states, triggering the first element number judging sub-module; and the state adding sub-module, configured for adding the third state into the set of states and triggering the first element number judging sub-module.

In an implementation of the present application, the learning apparatus further includes:

an action obtaining module, configured for obtaining an action in the set of actions;

wherein the action obtaining module comprises:

a second sequence collecting sub-module, configured for obtaining an action sequence corresponding to the information sequence, wherein the action sequence is composed of action elements, and the action elements in the action sequence correspond to the information elements in the information sequence one to one;

a second element number judging sub-module, configured for determining whether the number of action elements that have not been selected in the action sequence is greater than the preset number; when the number of action elements that have not been selected in the action sequence is greater than the preset number, triggering an action generating sub-module;

the action generating sub-module, configured for selecting the preset number of action elements from the action elements that have not been selected in the action sequence, to generate one action of the robot in the target object-searching scene as a first action;

an action judging sub-module, configured for determining whether the first action exists in the set of actions; when the first action does not exist in the set of actions, triggering an action adding sub-module; when the first action exists in the set of actions, triggering the second element number judging sub-module; and the action adding sub-module, configured for adding the first action into the set of actions and triggering the second element number judging sub-module.

In a fourth aspect, an embodiment of the present application provides an object-searching apparatus, which is applied to a robot. The apparatus includes:

an instruction receiving module, configured for receiving an object-searching instruction for searching for a target object in a target object-searching scene;

a state obtaining module, configured for obtaining a current state of the robot;

an action determining module, configured for determining an action performed by the robot in transitioning from the current state to a next state, according to an object-searching strategy, including the current state, for searching for the target object in an object-searching strategy pool, wherein an object-searching strategy in the object-searching strategy pool is a strategy by which the robot searches for the target object in the target object-searching scene and which is obtained by performing strategy learning by taking an optimal object-searching strategy for searching for the target object as a learning target, and includes: states successively experienced by the robot from an initial state of the object-searching strategy to a state that the target object is found, and an action performed by the robot in transitioning from each state to a next state;

a state transition module, configured for performing the determined action to realize a state transition, and determining whether the target object is found; and when the target object is not found, triggering the state obtaining module.

In an implementation of the present application, the action determining module includes:

an output value calculating sub-module, configured for calculating, according to the following expression, output values of a value function of a preset reinforcement learning algorithm in object-searching strategies including the current state in the strategy pool:

$$V_\pi = \sum_{m=n}^{M} \gamma^x R_e(S_m, \pi(S_m))$$

where $V_\pi$ represents an output value of the value function of the reinforcement learning algorithm in the object-searching strategy π, M represents the number of states included in the object-searching strategy π, m represents an identifier of each of the states in the object-searching strategy π, n represents an identifier of the current state in the object-searching strategy π, x represents the number of state transitions from the current state to a strategy end state in the object-searching strategy π, $\pi(S_m)$ represents an action performed by the robot in transitioning from a state $S_m$ to a next state in the object-searching strategy π, γ is a preset coefficient, 0<γ<1, and $R_e$ represents a reward function in the reinforcement learning algorithm;

a strategy selecting sub-module, configured for selecting an object-searching strategy corresponding to a maximum output value among the calculated output values as a target object-searching strategy; and an action determining sub-module, configured for determining an action performed by the robot in transitioning from the current state to a next state in the target object-searching strategy.

In an implementation of the present application, the state obtaining module includes:

a sequence collecting sub-module, configured for collecting an information sequence of the target object-searching scene, wherein the information sequence is composed of information elements comprising video frames and/or audio frames;

an element selecting sub-module, configured for selecting a preset number of information elements from the information sequence;

a state judging sub-module, configured for determining whether a state matching the selected information elements exists in a pre-obtained set of states of the target object-searching scene, wherein the set of states is a set of states of the robot in the target object-searching scene; and when a state matching the selected information elements exists in the pre-obtained set of states, triggering a state determining sub-module; and the state determining sub-module, configured for determining the state matching the selected information elements in the set of states as the current state of the robot.

In a fifth aspect, an embodiment of the present application provides a robot which includes a processor and a memory, wherein, the memory stores a computer program; and the processor, when executing the program stored on the memory, performs the method of the first aspect.

In a sixth aspect, an embodiment of the present application provides a computer readable storage medium, which is arranged in the robot, wherein a computer program is stored in the computer readable storage medium, and the computer program, when executed by a processor, so as to cause the processor to perform the method of the first aspect.

In a seventh aspect, an embodiment of the present application provides a robot which includes a processor and a memory, wherein, the memory stores a computer program; and the processor, when executing the program stored on the memory, performs the method of the second aspect.

In an eighth aspect, an embodiment of the present application provides a computer readable storage medium, which is arranged in the robot, wherein a computer program is stored in the computer readable storage medium, and the computer program, when executed by a processor, so as to cause the processor to perform the method of the second aspect.

In a ninth aspect, an embodiment of the present application provides an executable program code, which is executed to implement the method of the first aspect described above.

In a tenth aspect, an embodiment of the present application provides an executable program code, which is executed to implement the method of the second aspect described above.

As can be seen from above, in the solution provided by the embodiment of the present application, the robot obtains a target optimal object-searching strategy for searching for a target object whose initial state is one state in the set of states of the target object-searching scene, and performs strategy learning by taking the target optimal object-searching strategy as the learning target to obtain the object-searching strategy by which the robot searches for the target object in the target object-searching scene. In this way, the robot can search for the target object in the target object-searching scene with the object-searching strategy obtained by the strategy learning, without the positioning apparatus in the robot, and thus will not be affected by the object-searching scene, thereby increasing the success probability of searching for an object.

BRIEF DESCRIPTION OF THE DRAWINGS

In order to more clearly describe the technical solution of the embodiments of the application and the related art, drawings needed in the embodiments and the related art will be briefly described below. Obviously, the drawings described below are for only some embodiments of the present application, one of ordinary skills in the art can obtain other drawings based on these drawings without any creative efforts.

DETAILED DESCRIPTION

In order to make the objectives, technical solutions, and advantages of the present application clearer and more understandable, the present application will be described in more detail below with reference to the appended drawings and embodiments. Obviously, the described embodiments are only some, and not all, of the embodiments of the present application. All other embodiments obtained based on the embodiments of the present application by those skilled in the art without any creative efforts fall into the scope of protection defined by the present application.

Figure 1:
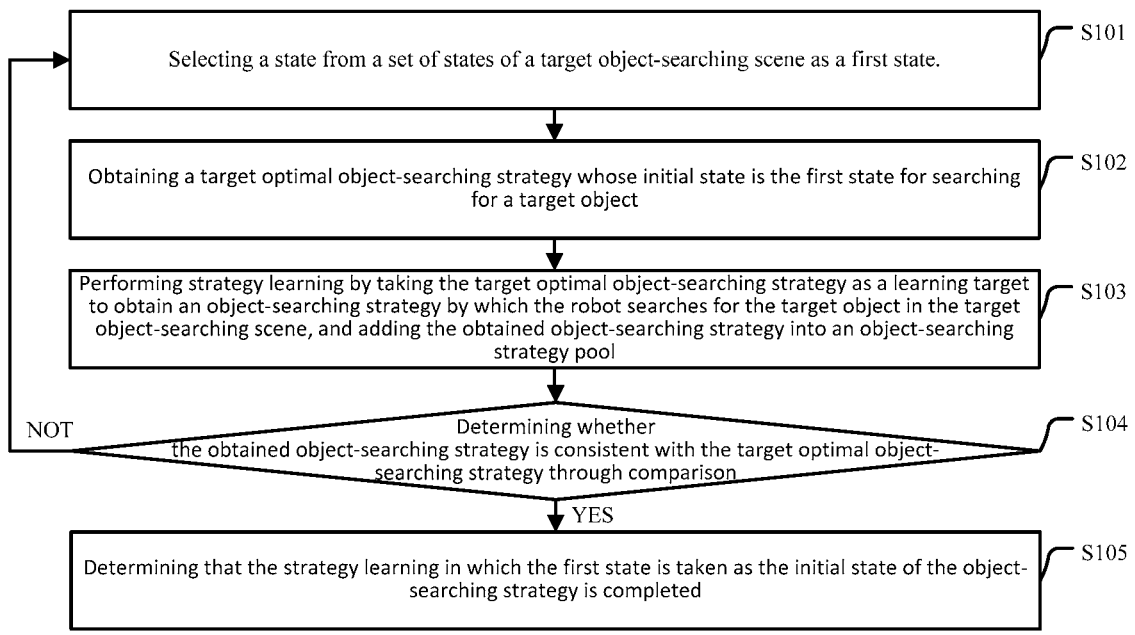
FIG. 1 is a flowchart of a machine learning method according to an embodiment of the present application.

FIG. 1 is a schematic flowchart of a machine learning method according to an embodiment of the present application. The method is applied to a robot. The method includes S101-S105.

S101: selecting a state from a set of states of a target object-searching scene as a first state.

A robot may operate in different scenes, such as a family scene, a factory floor scene, and the like. In any scene in which the robot operates, the robot may perform object searching. In this case, the scene in which the robot operates may also be called an object-searching scene. For example, in the family scene, it may be necessary for the robot to search for a pet dog kept in the home, a child's toy in the home and so on.

In addition, in different object-searching scenes, the robot may be in different positions and perform different operations due to the difference between the scenes. Therefore, the robot may be in different states in different object-searching scenes. Furthermore, the robot may be in different positions in a same object-searching scene during operation. Thus, the robot may be in different states in each object-searching scene.

In view of this, the set of states may be understood as corresponding to an object-searching scene of the robot, that is, the set of states may be understood as a set of states of the robot in a target object-searching scene.

For example, states of the robot in a family scene may be related to positions of the robot in the family scene. For example, the states may be that the robot is located in a central area of a living room, a southeast corner area of a study or the like in the family scene.

Most of the existing robots have vision and voice functions. In view of this, in one implementation of the present application, states of a robot in an object-searching scene may be determined from video frames and/or audio frames captured by the robot in this scene.

Specifically, in selecting a state from a set of states of a target object-searching scene, the state may be randomly selected from the set of states. Furthermore, the state may be selected from the set of states according to a certain rule. These are only exemplified, and the selection manner of the state is not limited in practical applications.

S102: obtaining a target optimal object-searching strategy whose initial state is the first state for searching for a target object.

Specifically, the process of searching for a target object by the robot may include:

transitioning from a current state of the robot to a next state;

determining whether a target object is found in a transitioned state;

when the target object is not found, repeating the above two steps until the target object is found.

The transitioning of the robot from the current state to the next state can be achieved by performing some actions. In addition, since the robot may perform different actions in the current state, the robot may be in different states after performing the actions.

Based on above description, the object-searching strategy may be understood as a strategy that the target object is found starting from the current state of the robot in the target object-searching scene. Specifically, the object-searching strategy includes: states successively experienced by the robot from the initial state of the object-searching strategy to a state that the target object is found, and an action performed by the robot in transitioning from each state to a next state.

The action performed by the robot in transitioning from each state to a next state may vary depending on its operation scene. Specifically, the above action may be left turn, right turn, forward walk, backward walk or the like, which is not limited in this application.

In an implementation of the present application, the next state of each state in the object-searching strategy and an action performed by the robot in transitioning from each state to the next state may be determined in the following manners.

According to probabilities of transitioning from a pre-transition state to other states pre-obtained in statistics, a post-transition state and an action that is performed by the robot in transitioning from the pre-transition state to the post-transition state and belongs to a set of actions of a target object-searching scene are determined.

Due to factors such as specific characteristics of the object-searching scene and characteristics of the robot itself, actions that can be performed by the robot during state transition in the object-searching process are generally limited. Based on this, the above set of actions is a set of actions performed by the robot during the state transition in the target object-searching scene.

After the set of states and the set of actions of the robot in the target object-searching scene are obtained, it may be simply considered that the states of the robot in the target object-searching scene and the actions that can be performed by the robot during the state transition have been determined. In view of this, in an implementation of the present application, the inventor collects data related to the state transition through a large number of random repeated experiments, and then obtains in statistics actions to be performed by the robot during the transition between two states and the probability of realizing the transition between two states under the corresponding action. For example, in random repeated experiments, the actions performed by the robot are captured by a binocular camera or a TOF (Time of Flight) camera to obtain three-dimensional data of the robot in each state, a set of state vectors of the robot in each state, or the like.

Specifically, probabilities of transitioning from one state to other states can be obtained in statistics by the following expression:

$$P(S_i, A_l, S_j) = x/y,$$

where, $P(S_i, A_l, S_j)$ represents a probability that the robot transitions from state $S_i$ to state $S_j$ by performing action $A_l$l, x represents the number of times that the combination ($S_i$, $A_i$, $S_j$) occurs in a large number of random repeated experiments, that is, the number of times that a fact that the robot transitions from the state $S_i$ to the state $S_j$ by performing the action $A_i$ occurs, y represents the number of times that the combination ($S_i$, $A_i$) occurs in a large number of random repeated experiments, that is, the number of times of performing the action $A_i$ by the robot in the state $S_i$.

Based on the above statistical manner, a state corresponding to the largest probability may be selected among probabilities of transitioning from a pre-transition state to other states pre-obtained in statistics as a post-transition state, and an action corresponding to the above largest probability is taken as an action to be performed by the robot in transitioning from the pre-transition state to the post-transition state.

In an implementation of the present application, a process of searching for a target object demonstrated by a person may be considered as an optimal process, and thus the above target optimal object-searching strategy may be: a strategy obtained by abstracting the process of searching for a target object starting from the first state demonstrated by a person.

S103: performing strategy learning by taking the target optimal object-searching strategy as a learning target to obtain an object-searching strategy by which the robot searches for the target object in the target object-searching scene, and adding the obtained object-searching strategy into an object-searching pool.

The same target object may be in different positions in different object-searching scenes. In addition, even for a target object in a position of one object-searching scene, different strategies may be used to search for the target object. Thus, it is necessary to learn the strategies for searching for the target object.

The obtained object-searching strategy is an object-searching strategy whose initial state is a first state and whose end state is a second state. The second state is a state of the robot corresponding to the position of the target object in the target object-searching scene.

Specifically, in one implementation, the second state may be input as a parameter into the robot at the beginning of executing the solution provided by the embodiment of the present application. In another implementation, in the process of searching for the target object, the robot may detect whether the target object is found by its own visual and/or voice functions after each transition to a new state, and if yes, the current state of the robot is determined as the second state.

The implementations are only exemplified, and in practical applications, the manner that the robot determines the second state is not limited.

The above object-searching strategy pool is used for storing an object-searching strategy for searching for an object in the target object-searching scene. Specifically, in the first case, an object-searching strategy stored in the object-searching strategy pool may be only the object-searching strategy for searching for the target object in the target object-searching scene. In the second case, an object-searching strategy stored in the object-searching strategy pool may be the object-searching strategy mentioned in the first case and an object-searching strategy for searching for other target objects in the target object-searching scene. These are only exemplified, and does not limit the object-searching strategy stored in the object-searching strategy pool.

It should be noted that, for each target object in the target object-searching scene, in order to facilitate learning of an object-searching strategy of the target object, the object-searching strategy pool will store an initial object-searching strategy for the target object. These initial object-searching strategies may be set randomly. With the learning of the object-searching strategies in this step, the learned object-searching strategies are added into the object-searching strategy pool. In this way, with continuous iterative learning, the object-searching strategies will become more and more abundant in the object-searching strategy pool.

In an implementation of the present application, an object-searching strategy by which the robot searches for a target object in the target object-searching scene may be obtained by a reinforcement learning algorithm.

S104: determining whether the obtained object-searching strategy is consistent with the target optimal object-searching strategy by comparing the obtained object-searching strategy and the target optimal object-searching strategy; when the obtained object-searching strategy is consistent with the target optimal object-searching strategy, performing S105; when the obtained object-searching strategy is not consistent with the target optimal object-searching strategy, returning to S101.

After returning to S101, in selecting a state from the set of states of the target object-searching scene, a state may still be selected randomly, or may be selected according to a certain rule. Furthermore, the reselected state may be the same as or different from the state previously selected, which is not limited in this application.

S105: determining that the strategy learning in which the first state is taken as the initial state of the object-searching strategy is completed.

As can be seen from above, in the solution provided by the embodiment of the present application, the robot obtains a target optimal object-searching strategy, whose initial state is one state in the set of states of the target object-searching scene, for searching for the target object, and performs strategy learning by taking the target optimal object-searching strategy as the learning target to obtain the object-searching strategy by which the robot searches for the target object in the target object-searching scene. In this way, the robot can search for the target object in the target object-searching scene with the object-searching strategy obtained by the strategy learning, without the positioning apparatus in the robot, and thus will not be affected by the object-searching scene, thereby increasing the success probability for searching for an object.

Figure 2:
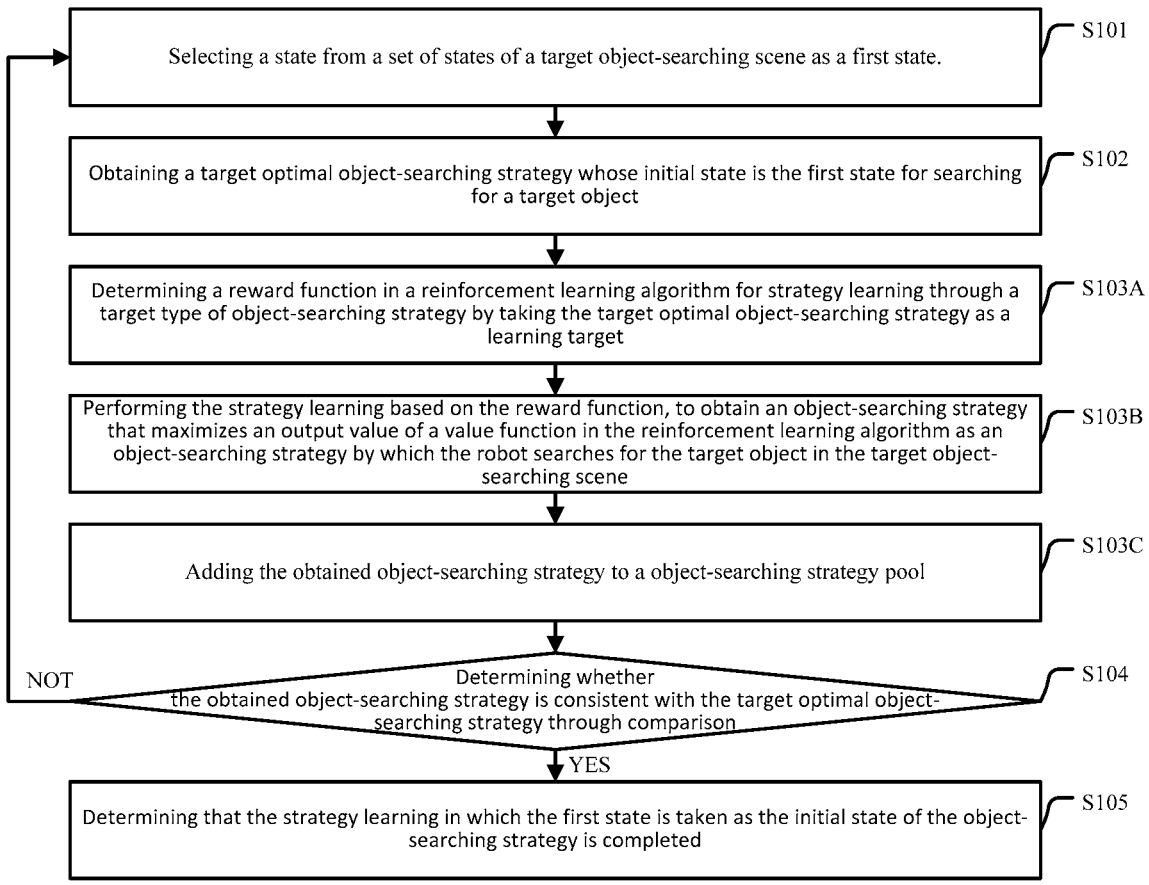
FIG. 2 is a flowchart of another machine learning method according to an embodiment of the present application.

In an embodiment of the present application, FIG. 2 provides a schematic flowchart of another machine learning method. Comparing with the embodiment shown in FIG. 1, in this embodiment, performing strategy learning by taking the target optimal object-searching strategy as a learning target to obtain an object-searching strategy by which the robot searches for the target object in the target object-searching scene, and adding the obtained object-searching strategy into an object-searching pool (S103) includes S103A-S103C.

S103A: determining a reward function in a reinforcement learning algorithm for strategy learning through a target type of object-searching strategy by taking the target optimal object-searching strategy as a learning target.

The target type of object-searching strategy is an object-searching strategy for searching for a target object in the object-searching strategy pool.

Reinforcement learning is a type of machine learning method. The reinforcement learning builds an abstract model of the real world through states and actions, targets an optimal reward, and finally finds the optimal strategy through some training and learning methods.

The inventor found through experiments that with the reinforcement learning, the robot can improve its performance through learning and select a behavior, then make a decision, and change a state by selecting and performing an action.

In addition, various reinforcement learning algorithms generally includes a reward function of the strategy and a value function of the strategy. The value function of the strategy is a function related to the reward function. In practical applications, due to differences between object-searching scenes, reward functions for the object-searching scenes are generally different. Therefore, it is necessary to perform learning with respect to specific object-searching scenes, to obtain reward functions suitable for different object-searching scenes.

S103B: performing the strategy learning based on the reward function, to obtain an object-searching strategy that maximizes an output value of a value function in the reinforcement learning algorithm as an object-searching strategy by which the robot searches for the target object in the target object-searching scene.

S103C: adding the obtained object-searching strategy into an object-searching strategy pool.

In the solution provided by the embodiment, an reinforcement learning algorithm is introduced in strategy learning, so that the robot can learn more efficiently the object-searching strategy for searching for the target object.

The machine learning method provided by the embodiment of the present application is further described below through several specific embodiments.

Embodiment 1

Based on the embodiment shown in FIG. 2, determining a reward function in a reinforcement learning algorithm for strategy learning by taking the target optimal object-searching strategy as a learning target and using a target type of object-searching strategy (S103A) includes:

determining a reward function R that maximizes a value of the following expression as the reward function in the reinforcement learning algorithm for strategy learning:

$$\text{maximise}\left(\sum_{i=1}^{k} p\big(V_{\pi_d}(S_0) - V_{\pi_i}(S_0)\big)\right) \text{ where,}$$

$$V_\pi = \sum_{m}^{M} \gamma^t R(S_m, \pi(S_m))$$

$$p(x) = \begin{cases} x, & x \geq 0 \\ 2x, & x < 0 \end{cases}$$

k represents the number of object-searching strategies for searching for the target object included in the object-searching strategy pool, i represents an identifier of each object-searching strategy for searching for the target object in the object-searching strategy pool, $\pi_i$ represents an object-searching strategy for searching for the target object, identified by i, in the object-searching strategy pool, $\pi_d$ represents the target optimal object-searching strategy, $S_0$ represents the first state, $V_\pi$ represents an output value of the value function of the reinforcement learning algorithm in the object-searching strategy $\pi$, M represents the number of states included in the object-searching strategy $\pi$, m represents an identifier of each of the states in the object-searching strategy $\pi$, t represents the number of state transitions in the object-searching strategy $\pi$, $\pi(S_m)$ represents an action performed by the robot in transitioning from a state $S_m$ to a next state in the object-searching strategy $\pi$, $\gamma$ is a preset coefficient, $0<\gamma<1$, and maximise( ) represents a function that returns the maximum value.

Based on the above description, it can be known that the $V_\pi(\ )$ represents an output value of the value function of the reinforcement learning algorithm in the object-searching strategy $\pi_d$, and the $V_{\pi_i}(\ )$ represents an output value of the value function of the reinforcement learning algorithm in the object-searching strategy $\pi_i$.

Embodiment 2

Based on the above embodiment 1, performing the strategy learning based on the reward function, to obtain an object-searching strategy that maximizes an output value of a value function in the reinforcement learning algorithm includes:

obtaining, through learning, object-searching strategies whose initial states are the first state and whose end states are the second state, in a preset state transition manner;

calculating, according to the following expression, an output value of the value function in the reinforcement learning algorithm in each of the obtained object-searching strategies:

$$V_\pi = \sum_{m}^{M} \gamma^t R_e(S_m, \pi(S_m))$$

where $R_e$ represents a reward function in the reinforcement learning algorithm;

determining an object-searching strategy corresponding to a maximum output value among the calculated output values as an object-searching strategy that maximizes an output value of the value function in the reinforcement learning algorithm.

Specifically, the preset state transition manner may be a manner of performing state transition according to a predetermined transition relationship between states.

Corresponding to the above, in an implementation of the present application, the preset state transition manner may be:

according to probabilities of transitioning from a pre-transition state to other states pre-obtained in statistics, determining a post-transition state and an action, belonging to a set of actions of a target object-searching scene, performed by the robot in transitioning from the pre-transition state to the post-transition state, and then performing the determined action to transition from the pre-transition state to the post-transition state, so as to realize the state transition.

Specifically, probabilities of transitioning from one state to other states may be obtained in statistics by the following expression:

$$P(S_i, A_i, S_j) = x/y$$

where, $P(S_i, A_i, S_j)$ represents a probability that the robot transitions from state Si to state Sj by performing action Ai, x represents the number of times that the combination (Si, Ai, Sj) occurs in a large number of random repeated experiments, that is, the number of times that a fact that the robot transitions from the state Si to the state Sj by performing the action Ai occurs, y represents the number of times that the combination (Si, Ai) occurs in a large number of random repeated experiments, that is, the number of times of performing the action Ai by the robot in the state Si.

Base on the above statistical manner, in determining a post-transition state and an action, belonging to a set of actions of a target object-searching scene, performed by the robot in transitioning from the pre-transition state to the post-transition state, a state corresponding to the largest probability may be selected among probabilities of transitioning from a pre-transition state to other states pre-obtained in statistics as a post-transition state, and an action corresponding to the above largest probability is taken as an action to be performed by the robot in transitioning from the pre-transition state to the post-transition state.

The set of states and the set of actions mentioned above may be generated in advance, which will be described in detail below by two specific embodiments.

As can be seen from above, in the solution provided by each of embodiments of the present application, the robot performs strategy learning for the object-searching strategy with the reinforcement learning algorithm by taking one state in the set of states of the target object-searching scene as the initial state of the object-searching strategy, to obtain various object-searching strategies for searching for a target object in the target object-searching scene. In this way, the robot searches for the target object in the target object-searching scene with the above obtained object-searching strategies, without the positioning apparatus in the robot. Therefore, the robot will not be affected by the object-searching scene, thereby increasing the success probability of searching for an object. In addition, due to the advantage of the reinforcement learning algorithm, the robot can learn efficiently the object-searching strategy in strategy learning, thereby improving the performance of the robot.

Embodiment 3

Figure 3:
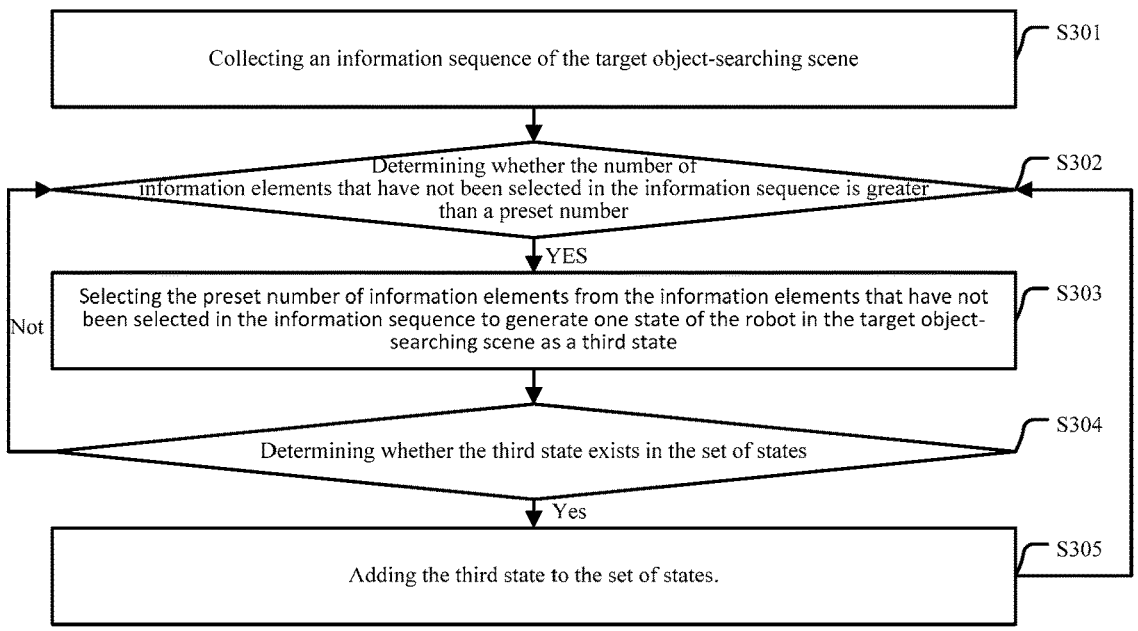
FIG. 3 a flowchart of a method for obtaining a state in a set of states according to an embodiment of the present application.

FIG. 3 provides a schematic flowchart of a method for obtaining a state in the set of states. The method includes S301-S305.

S301: collecting an information sequence of the target object-searching scene.

The above information sequence is composed of information elements. The information elements include video frames and/or audio frames.

Specifically, the above information sequence may be collected by the robot in arbitrary cruise in the target object-searching scene.

S302: determining whether the number of information elements that have not been selected in the information sequence is greater than a preset number; when the number of information elements that have not been selected in the information sequence is greater than the preset number, performing S303.

The preset number may be set according to statistical results of multiple experiments, or may be set according to information such as the type of the target object-searching scene and the like, which is not limited in this application.

S303: selecting the preset number of information elements from the information elements that have not been selected in the information sequence to generate one state of the robot in the target object-searching scene as a third state.

In an implementation of the present application, in generating one state of the robot in the target object-searching scene, a vector may be formed by the selected information elements, and one state of the robot in the target object-searching scene may be represented by the formed vector.

S304: determining whether the third state exists in the set of states; when the third state does not exist in the set of states, performing S305; when the third state exists in the set of states, returning directly to S302.

Specifically, in determining whether the third state exists in the set of states, a vector representing the third state may be matched with vectors representing the states in the set of states one by one. If a vector matching the vector representing the third state exists, it is indicated that the third state exists in the set of states; otherwise, it is indicated that the third state does not exist in the set of states.

In addition, in one implementation of the present application, it is also possible to detect whether the third state is similar to each state in the set of states through a pre-trained network model.

Specifically, the above network model may be trained and obtained by:

collecting, by the robot, an information sequence when cruising arbitrarily in the target object-searching scene as a sample information sequence;

selecting sample segments from the sample information sequence and marking the selected sample segments with states;

forming a set(s) of two model input parameters by sample segments marked with states, and performing model training by inputting the set(s) of two model input parameters to a preset neural network model, to obtain a network model for detecting whether the two states are similar, wherein the network model may also called a twinning network model.

Specifically, the information sequence collected by the robot when cruising arbitrarily in the target object-searching scene is environment information of the object-searching scene. The above information sequence may be composed of information elements, including video frames and/or audio frames.

Selecting a sample segment from a sample information sequence may be understood as: selecting several consecutively collected information elements in the sample information sequence. In order to facilitate the description, a set of the selected information elements is referred to as a sample segment this application. The number of the selected information elements may be equal to or not equal to the preset number, which is not limited in the present application.

In addition, since the sample information sequence is randomly collected by the robot when cruising in the target object-searching scene, contents in the sample information sequence may be unrepresentative, or a large number of repeated contents exist in the collected sample sequence, or so on. In view of this, in selecting sample segments from the sample information sequence, information elements meeting the above conditions may not be selected in the sample information sequence so as to better training the network model.

S305: adding the third state into the set of states, and returning to S302.

In this embodiment, the robot obtains its states in the target object-searching scene by collecting the information sequence of the target object-searching scene and analyzing the information sequence, so that on the one hand, the user does not need to manually set a state of the robot in the target object-searching scene, improving automation degree of the robot; on the other hand, the robot can adaptively obtain its state in different scenes according to the different scenes, improving the adaptability of the robot for different scenes.

Embodiment 4

This embodiment provides a method for obtaining an action in a set of actions, which is similar to the method for obtaining states in a set of states provided in the above embodiment 3. Specifically, the method includes:

obtaining an action sequence corresponding to the information sequence, wherein the action sequence is composed of action elements, and the action elements in the action sequence correspond to the information elements in the information sequence one to one;

determining whether the number of action elements that have not been selected in the action sequence is greater than the preset number;

when the number of action elements that have not been selected in the action sequence is greater than the preset number, selecting the preset number of action elements from the action elements that have not been selected in the action sequence, to generate one action of the robot in the target object-searching scene as a first action;

determining whether the first action exists in the set of actions;

when the first action does not exist in the set of actions, adding the first action into the set of actions, and returning to the step of determining whether the number of action elements that have not been selected in the action sequence is greater than the preset number;

when the first action exists in the set of actions, directly returning to the step of determining whether the number of action elements that have not been selected in the action sequence is greater than the preset number.

The specific manner of obtaining an action in the set of actions is similar to the manner of obtaining an state in the set of states in the above embodiment 3, except for "action" and "state". The related description may refer to the part of embodiment 3, which is not described again herein.

In this embodiment, the robot obtains its actions in the target object-searching scene by collecting an action sequence corresponding to the information sequence of the target object-searching scene and analyzing the action sequence, so that on the one hand, the user does not need to manually set an action of the robot in the target object-searching scene, improving automation degree of the robot; on the other hand, the robot can adaptively obtain its action according to different scenes, improving the adaptability of the robot for different scenes.

Corresponding to the above machine learning method, an embodiment of the present application further provides an object-searching method.

Figure 4:
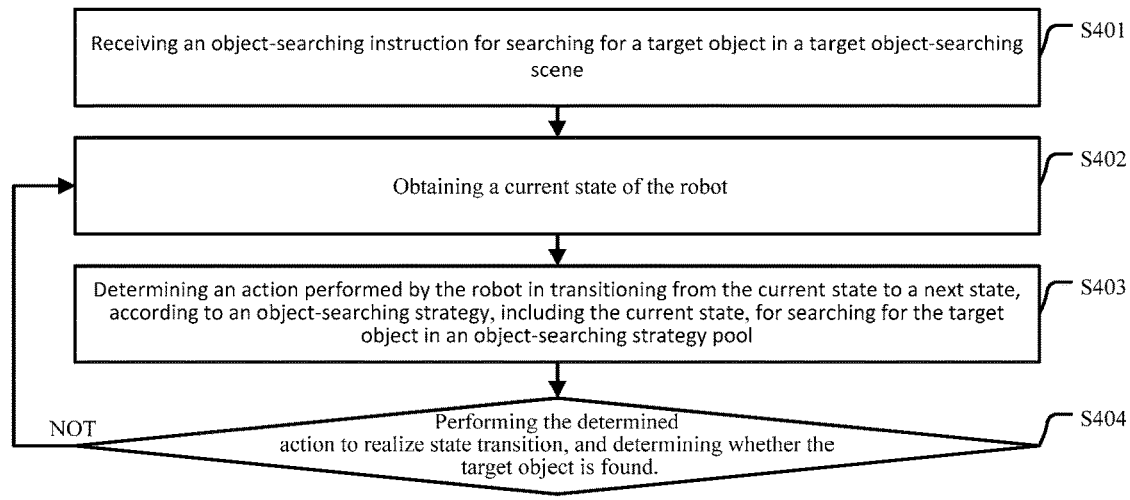
FIG. 4 is a flowchart of an object-searching method according to an embodiment of the present application.

FIG. 4 provides a schematic flowchart of an object-searching method. The method is applied to a robot, and includes S401-S404.

S401: receiving an object-searching instruction for searching for a target object in a target object-searching scene.

S402: obtaining a current state of the robot.

S403: determining, according to an object-searching strategy including the current state for searching for the target object in an object-searching strategy pool, an action performed by the robot in transitioning from the current state to a next state.

The object-searching strategy in the above object-searching strategy pool may be a strategy by which a robot searches for a target object in a target-searching scene, obtained by performing strategy learning by taking an optimal object-searching strategy for searching for a target object as a learning target.

Specifically, the specific manner for strategy learning may refer to the specific manner provided by the above embodiment of the machine learning method, which is not described again herein.

The object-searching strategy includes: states successively experienced by the robot from the initial state of the object-searching strategy to a state that the target object is found, and an action performed by the robot in transitioning from each state to a next state.

S404: performing the determined action to realize state transition, and determining whether the target object is found; when the target object is not found, returning to S402 until the target object is found.

In an implementation of the present application, determining, according to an object-searching strategy including the current state for searching for the target object in an object-searching strategy pool, an action performed by the robot in transitioning from the current state to a next state (S403) includes:

calculating, according to the following expression, output values of a value function in a preset reinforcement learning algorithm in object-searching strategies including the current state for searching for the target object in an object-searching strategy pool:

$$V_\pi = \sum_{m=n}^{M} \gamma^x R_e(S_m, \pi(S_m))$$

where $V_\pi$ represents an output value of the value function of the reinforcement learning algorithm in the object-searching strategy $\pi$, M represents the number of states included in the object-searching strategy $\pi$, m represents an identifier of each of states in the object-searching strategy $\pi$, n represents an identifier of the current state in the object-searching strategy $\pi$, x represents the number of state transitions from the current state to a strategy end state in the object-searching strategy $\pi$, $\pi(S_m)$ represents an actions performed by the robot in transitioning from a state $S_m$ to a next state in the object-searching strategy $\pi$, $\gamma$ is a preset coefficient, $0<\gamma<1$, and $R_e$ represents a reward function in the reinforcement learning algorithm;

selecting an object-searching strategy corresponding to the maximum output value among the calculated output values as a target object-searching strategy; and determining an action performed by the robot in transitioning from the current state to a next state in the target object-searching strategy.

In an implementation of the present application, in obtaining the current state of the robot, an information sequence of the target-searching scene may be collected; a preset number of information elements are selected from the information sequence; it is determined whether a state matching the selected information elements exists in a pre-obtained set of states of the target object-searching scene; and if yes, the state matching the selected information elements in the set of states is determined as the current state of the robot.

The above information sequence is composed of information elements, including video frames and/or audio frames. The set of states is a set of states of the robot in the target object-searching scene.

As can be seen from above, in the solution provided by each of embodiments of the present application, the robot performs strategy learning by taking an optimal object-searching strategy for searching for the target object as a learning target, to obtain strategies for searching for the target object by the robot in the target object-searching scene, and then the robot searches for the target object with the above obtained object-searching strategies. In this way, the robot can search for an object without the positioning apparatus in the robot, so the robot will not be affected by the object-searching scene, increasing the success probability of searching for an object.

Corresponding to the above machine learning method, an embodiment of the present application further provides a machine learning apparatus.

Figure 5:
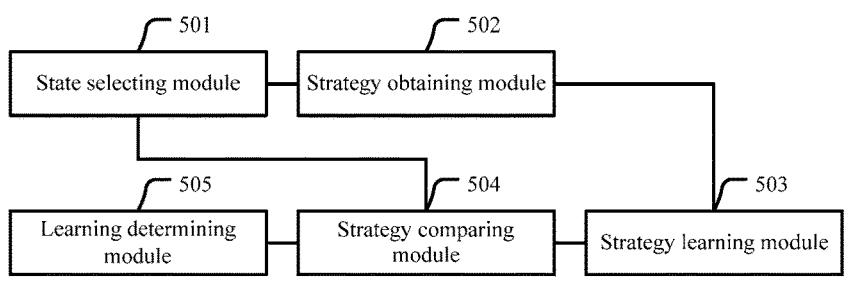
FIG. 5 is a structural diagram of a machine learning apparatus according to an embodiment of the present application.

FIG. 5 shows a machine learning apparatus according to an embodiment of the present application. The apparatus is applied to a robot. The apparatus includes:

a state selecting module 501, configured for selecting a state from a set of states of a target object-searching scene as a first state, wherein the set of states is a set of states of the robot in the target object-searching scene;

a strategy obtaining module 502, configured for obtaining a target optimal object-searching strategy whose initial state is the first state for searching for a target object, wherein the object-searching strategy includes: states successively experienced by the robot from the initial state of the object-searching strategy to a state that the target object is found, and an action performed by the robot in transitioning from each state to a next state;

a strategy learning module 503, configured for performing strategy learning by taking the target optimal object-searching strategy as a learning target to obtain an object-searching strategy by which the robot searches for the target object in the target object-searching scene, and adding the obtained object-searching strategy into an object-searching strategy pool, wherein the obtained object-searching strategy is an object-searching strategy whose initial state is the first state and whose end state is a second state, wherein the second state is a state of the robot corresponding to a position of the target object in the target object-searching scene;

a strategy comparing module 504, configured for determining whether the obtained object-searching strategy is consistent with the target optimal object-searching strategy by comparing the obtained object-searching strategy and the target optimal object-searching strategy; when the obtained object-searching strategy is consistent with the target optimal object-searching strategy, triggering a learning determining module; and when the obtained object-searching strategy is not consistent with the target optimal object-searching strategy, triggering the state selecting module; and the learning determining module 505, configured for determining that the strategy learning in which the first state is taken as the initial state of the object-searching strategy is completed.

Optionally, a next state of each state and an action performed by the robot in transitioning from each state to a next state in the object-searching strategy are determined according to probabilities of transitioning from a pre-transition state to other states pre-obtained in statistics.

The action performed by the robot in transitioning from each state to a next state belongs to a set of actions of the target object-searching scene, wherein the set of actions is performed by the robot in performing state transitions in the target object-searching scene.

As can be seen from above, in the solution provided by the embodiment of the present application, the robot obtains a target optimal object-searching strategy, whose initial state is one state in the set of states of the target object-searching scene, for searching for the target object, and performs strategy learning by taking the target optimal object-searching strategy as the learning target to obtain the object-searching strategy by which the robot searches for the target object in the target object-searching scene. In this way, the robot can search for the target object in the target object-searching scene with the object-searching strategy obtained by the strategy learning, without the positioning apparatus in the robot, and thus will not be affected by the object-searching scene, thereby increasing the success probability for searching for an object.

Figure 6:
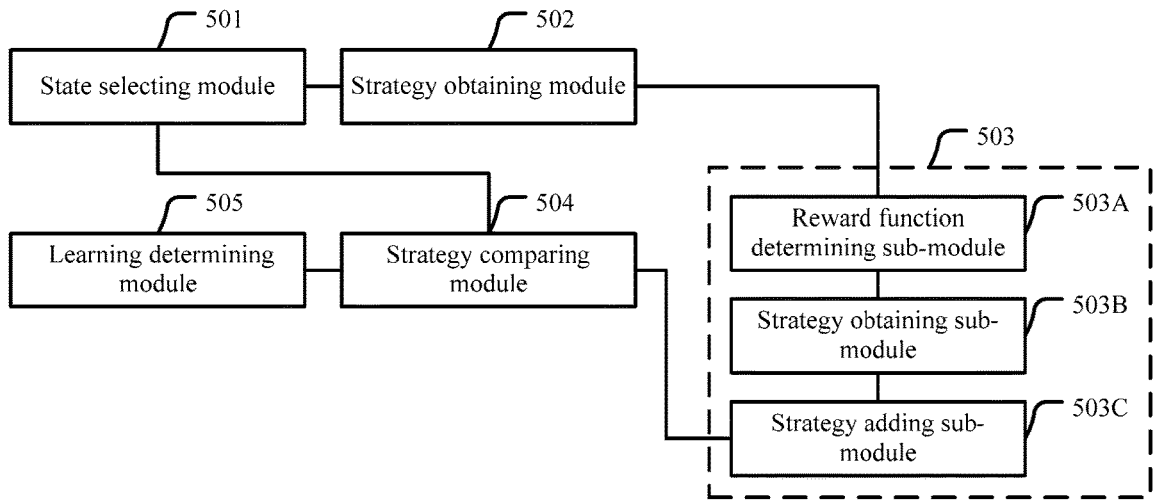
FIG. 6 is a structural diagram of another machine learning apparatus according to an embodiment of the present application.

In an embodiment of the present application, FIG. 6 provides a structural diagram of another machine learning apparatus. Comparing to the embodiment shown in FIG. 5, in the present embodiment, the strategy learning module 503 includes:

a reward function determining sub-module 503A, configured for determining a reward function in a reinforcement learning algorithm for strategy learning through a target type of object-searching strategy by taking the target optimal object-searching strategy as a learning target, wherein the target type of object-searching strategy is an object-searching strategy for searching for the target object in the target object-searching pool;

a strategy obtaining sub-module 503B, configured for performing the strategy learning based on the reward function, to obtain an object-searching strategy that maximizes an output value of a value function in the reinforcement learning algorithm as an object-searching strategy by which the robot searches for the target object in the target object-searching scene; and a strategy adding sub-module 503C, configured for adding the obtained object-searching strategy into an object-searching strategy pool.

Optionally, the reward function determining sub-module 503A is specifically configured for determining a reward function R that maximizes a value of the following expression as the reward function in the reinforcement learning algorithm for strategy learning:

$$\text{maximise}\left(\sum_{i=1}^{k} p\left(V_{\pi_d}(S_0) - V_{\pi_i}(S_0)\right)\right) \text{ where,}$$

$$V_\pi = \sum_{m}^{M} \gamma^t R(S_m, \pi(S_m))$$

$$p(x) = \begin{cases} x, & x \geq 0 \\ 2x, & x < 0 \end{cases}$$

k represents the number of object-searching strategies for searching for the target object included in the object-searching strategy pool, i represents an identifier of each object-searching strategy for searching for the target object in the object-searching strategy pool, $\pi_i$ represents an object-searching strategy for searching for the target object, identified by i, in the object-searching strategy pool, $\pi_d$ represents the target optimal object-searching strategy, $S_0$ represents the first state, $V_\pi$ represents an output value of the value function of the reinforcement learning algorithm in the object-searching strategy $\pi$, M represents the number of states included in the object-searching strategy $\pi$, m represents an identifier of each of the states in the object-searching strategy $\pi$, t represents the number of state transitions in the object-searching strategy $\pi$, $\pi(S_m)$ represents an action performed by the robot in transitioning from a state $S_m$ to a next state in the object-searching strategy $\pi$, $\gamma$ is a preset coefficient, $0<\gamma<1$, and maximise( ) represents a function that returns the maximum value.

Specifically, the strategy learning sub-module 503B may include:

a strategy learning unit, configured for obtaining, through learning, object-searching strategies whose initial states are the first state and whose end states are the second state in a preset state transition manner;

an output value calculating unit, configured for calculating, according to the following expression, an output value of the value function of the reinforcement learning algorithm in each of the obtained object-searching strategies:

$$V_\pi = \sum_m^M \gamma^t R_e(S_m, \pi(S_m))$$

where $R_e$ represents a reward function in the reinforcement learning algorithm;

a strategy determining unit, configured for determining an object-searching strategy corresponding to a maximum output value among the calculated output values as an object-searching strategy that maximizes an output value of the value function of the reinforcement learning algorithm; and a strategy adding unit, configured for adding the obtained object-searching strategy into the object-searching strategy pool.

As can be seen from above, in the solution provided by each of embodiments of the present application, the robot performs strategy learning for the object-searching strategy by taking one state in the set of states of the target object-searching scene as the initial state of the object-searching strategy and using the preset reinforcement learning algorithm to obtain various object-searching strategies for searching for the target object in the target object-searching scene. In this way, the robot searches for the target object in the target object-searching scene with the obtained object-searching strategy, without the positioning apparatus in the robot, so it will not be affected by the object-searching scene, thereby increasing the success probability of searching for an object.

In an implementation of the present application, the learning apparatus further includes: a state obtaining module 506.

The state obtaining module 506 is configured for obtaining a state in the set of states.

Figure 7:
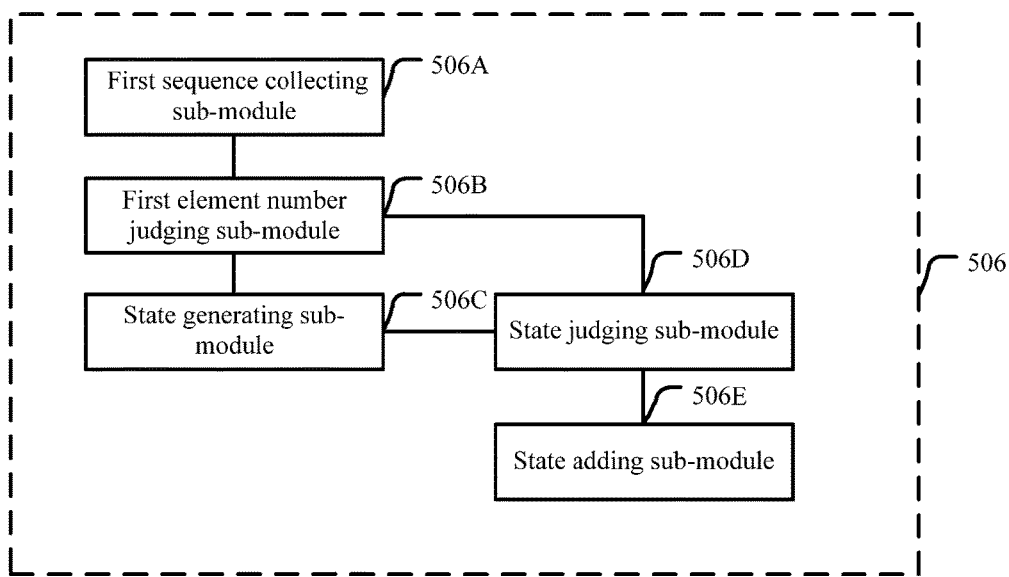
FIG. 7 a structural diagram of an apparatus for obtaining a state in a set of states according to an embodiment of the present application.

Specifically, FIG. 7 shows a structural diagram of an apparatus for obtaining a state in a set of states, that is, the state obtaining module 506. The state obtaining module 506 includes:

a first sequence collecting sub-module 506A, configured for collecting an information sequence of the target object-searching scene, wherein the information sequence is composed of information elements comprising video frames and/or audio frames;

a first element number judging sub-module 506B, configured for determining whether the number of information elements that have not been selected in the information sequence is greater than a preset number; when the number of information elements that have not been selected in the information sequence is greater than the preset number, triggering a state generating sub-module 506C;

the state generating sub-module 506C, configured for selecting the preset number of information elements from the information elements that have not been selected in the information sequence to generate one state of the robot in the target object-searching scene as a third state;

a state judging sub-module 506D, configured for determining whether the third state exists in the set of states; when the third state does not exist in the set of states, triggering a state adding sub-module 506E; and when the third state exists in the set of states, triggering the first element number judging sub-module 506B; and the state adding sub-module 506E, configured for adding the third state into the set of states and triggering the first element number judging sub-module 506B.

In another implementation of the present application, the apparatus may further include:

an action obtaining module, configured for obtaining an action in the set of actions;

wherein the action obtaining module comprises:

a second sequence collecting sub-module, configured for obtaining an action sequence corresponding to the information sequence, wherein the action sequence is composed of action elements, and the action elements in the action sequence correspond to the information elements in the information sequence one to one;

a second element number judging sub-module, configured for determining whether the number of action elements that have not been selected in the action sequence is greater than the preset number; when the number of action elements that have not been selected in the action sequence is greater than the preset number, triggering an action generating sub-module;

the action generating sub-module, configured for selecting the preset number of action elements from the action elements that have not been selected in the action sequence, to generate one action of the robot in the target object-searching scene as a first action;

an action judging sub-module, configured for determining whether the first action exists in the set of actions; when the first action does not exist in the set of actions, triggering an action adding sub-module; when the first action exists in the set of actions, triggering the second element number judging sub-module; and the action adding sub-module, configured for adding the first action into the set of actions and triggering the second element number judging sub-module.

Corresponding to the above object-searching method, an embodiment of the present application further provides an object-searching apparatus.

Figure 8:
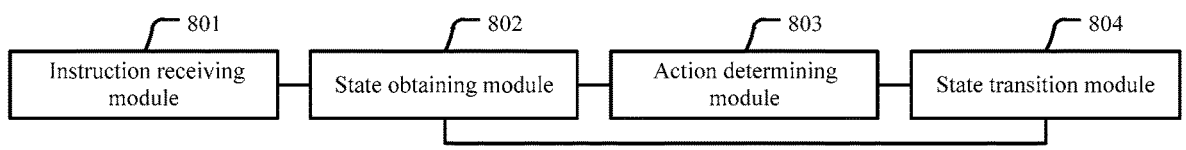
FIG. 8 is a structural diagram of an object-searching apparatus according to an embodiment of the present application.

FIG. 8 is a structural diagram of an object-searching apparatus according to an embodiment of the present application. The apparatus is applied to a robot. The apparatus includes:

an instruction receiving module 801, configured for receiving an object-searching instruction for searching for a target object in a target object-searching scene;

a state obtaining module 802, configured for obtaining a current state of the robot;

an action determining module 803, configured for determining an action performed by the robot in transitioning from the current state to a next state, according to an object-searching strategy, including the current state, for searching for the target object in an object-searching strategy pool, wherein an object-searching strategy in the object-searching strategy pool is a strategy by which the robot searches for the target object in the target object-searching scene and which is obtained by performing strategy learning by taking an optimal object-searching strategy for searching for the target object as a learning target, and includes: states successively experienced by the robot from an initial state of the object-searching strategy to a state that the target object is found, and an action performed by the robot in transitioning from each state to a next state;

a state transition module 804, configured for performing the determined action to realize a state transition, and determining whether the target object is found; and when the target object is not found, triggering the state obtaining module 802.

Specifically, the action determining module 803 may include:

an output value calculating sub-module, configured for calculating, according to the following expression, output values of a value function of a preset reinforcement learning algorithm in object-searching strategies including the current state in the strategy pool:

$$V_\pi = \sum_{m=n}^{M} \gamma^x R_e(S_m, \pi(S_m))$$

where $V_\pi$ represents an output value of the value function of the reinforcement learning algorithm in the object-searching strategy $\pi$, M represents the number of states included in the object-searching strategy $\pi$, m represents an identifier of each of the states in the object-searching strategy $\pi$, n represents an identifier of the current state in the object-searching strategy $\pi$, x represents the number of state transitions from the current state to a strategy end state in the object-searching strategy $\pi$, $\pi(S_m)$ represents an action performed by the robot in transitioning from a state $S_m$ to a next state in the object-searching strategy $\pi$, $\gamma$ is a preset coefficient, $0<\gamma<1$, and $R_e$ represents a reward function in the reinforcement learning algorithm;

a strategy selecting sub-module, configured for selecting an object-searching strategy corresponding to a maximum output value among the calculated output values as a target object-searching strategy;

an action determining sub-module, configured for determining an action performed by the robot in transitioning from the current state to a next state in the target object-searching strategy.

Specifically, the state obtaining module 602 may include:

a sequence collecting sub-module, configured for collecting an information sequence of the target object-searching scene, wherein the information sequence is composed of information elements comprising video frames and/or audio frames;

an element selecting sub-module, configured for selecting a preset number of information elements from the information sequence;

a state judging sub-module, configured for determining whether a state matching the selected information elements exists in a pre-obtained set of states of the target object-searching scene, wherein the set of states is a set of states of the robot in the target object-searching scene; and when a state matching the selected information elements exists in the pre-obtained set of states, triggering a state determining sub-module; and the state determining sub-module, configured for determining the state matching the selected information elements in the set of states as the current state of the robot.

As can be seen from above, in the solution provided by each of embodiments of the present application, the robot performs strategy learning by taking an optimal object-searching strategy of searching for the target object as a learning target, to obtain strategies by which the robot searches for the target object in the target object-searching scene, and then the robot searches for the target object based on the obtained object-searching strategies. In this way, the robot can searches for the target object without using the positioning apparatus in the robot, and thus will not be affected by the object-searching scene, increasing the success probability of searching for an object.

Corresponding to the above learning method and learning apparatus, an embodiment of the present application further provides a robot.

Figure 9:
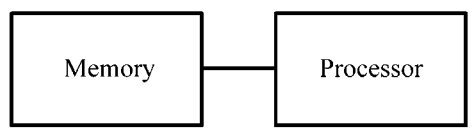
FIG. 9 is a structural diagram of a robot according to an embodiment of the present application.

FIG. 9 is structural diagram of a robot according to an embodiment of the present application, including a processor and a memory.

The memory stores a computer program.

The processor, when executing the program stored on the memory, performs the method of according to the embodiments of the present application.

Specifically, the machine learning method includes:

selecting a state from a set of states of a target object-searching scene as a first state, wherein the set of states is a set of states of the robot in the target object-searching scene;

obtaining a target optimal object-searching strategy whose initial state is the first state for searching for a target object, wherein the object-searching strategy includes: states successively experienced by the robot from the initial state of the object-searching strategy to a state that the target object is found, and an action performed by the robot in transitioning from each state to a next state;

performing strategy learning by taking the target optimal object-searching strategy as a learning target to obtain an object-searching strategy by which the robot searches for the target object in the target object-searching scene, and adding the obtained object-searching strategy into an object-searching strategy pool, wherein the obtained object-searching strategy is an object-searching strategy whose initial state is the first state and whose end state is a second state, wherein the second state is a state of the robot corresponding to a position of the target object in the target object-searching scene;

determining whether the obtained object-searching strategy is consistent with the target optimal object-searching strategy by comparing the obtained object-searching strategy and the target optimal object-searching strategy;

when the obtained object-searching strategy is consistent with the target optimal object-searching strategy, determining that the strategy learning in which the first state is taken as the initial state of the object-searching strategy is completed; and when the obtained object-searching strategy is not consistent with the target optimal object-searching strategy, returning to the step of selecting a state from a set of states of a target object-searching scene.

It should be noted that other embodiments of the machine learning method implemented by the processor when executing the program on the memory are the same as the embodiments of the machine learning method mentioned in the method embodiments, and thus are not described again herein.

In one implementation, the above robot further includes at least one of:

an image acquisition apparatus, a wheel, a mechanical leg, robotic arm, and so on.

In the solution provided by the embodiment of the present application, the robot obtains a target optimal object-searching strategy whose initial state is one state in the set of states of the target object-searching scene for searching for a target object, and performs strategy learning by taking the target optimal object-searching strategy as the learning target to obtain the object-searching strategy by which the robot searches for the target object in the target object-searching scene. In this way, the robot can search for the target object in the target object-searching scene with the object-searching strategy obtained by the strategy learning, without the positioning apparatus in the robot, and thus will not be affected by the object-searching scene, thereby increasing the success probability of searching for an object.

Corresponding to the above object-searching method and object-searching apparatus, the embodiment of the present application further provides a robot.

Figure 10:
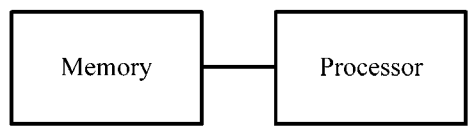
FIG. 10 is a structural diagram of another robot according to an embodiment of the present application.

FIG. 10 is a structural diagram of another robot according to an embodiment of the present application, including a processor and a memory.

The memory stores a computer program.

The processor, when executing the program stored on the memory, performs the method according to the embodiment of the present application.

Specifically, the above object-searching method includes:

receiving an object-searching instruction for searching for a target object in a target object-searching scene;

obtaining a current state of the robot;

determining an action performed by the robot in transitioning from the current state to a next state, according to an object-searching strategy, including the current state, for searching for the target object in an object-searching strategy pool, wherein an object-searching strategy in the object-searching strategy pool is a strategy by which the robot searches for the target object in the target object-searching scene and which is obtained by performing strategy learning by taking an optimal object-searching strategy for searching for the target object as a learning target, and includes: states successively experienced by the robot from an initial state of the object-searching strategy to a state that the target object is found, and an action performed by the robot in transitioning from each state to a next state;

performing the determined action to realize a state transition, and determining whether the target object is found; and when the target object is not found, returning to the step of obtaining a current state of the robot until the target object is found.

It should be noted that other embodiments of the object-searching method implemented by the processor when executing the program on the memory are the same as the embodiments of the object-searching method, which are not described again herein.

In an implementation, the above robot further includes at least one of:

an image acquisition device, a wheel, a mechanical leg, a robotic arm, and so on.

As can be seen from above, in the solution provided by embodiments of the present application, the robot performs strategy learning by taking an optimal object-searching strategy for searching for the target object as a learning target, to obtain a strategy by which the robot searches for a target object in the target object-searching scene, and then the robot searches for the target object based on the above obtained object-searching strategies. In this way, the robot searches for the target object without the positioning apparatus in the robot, and thus will not be affected by the object-searching scene, increasing the success probability of searching for an object.

It should be noted that the memory mentioned in the above two robots may include a random access memory (RAM), or may include a non-volatile memory (NVM), for example at least one disk memory. Optionally, the memory may also be at least one storage apparatus located away from the processor described above.

The processor mentioned in the above two robots may be a general-purpose processor, such as a central processing unit (CPU), a network processor (NP), or the like; it may also be a digital signal processor (DSP), an application specific integrated circuit (ASIC), a field-programmable gate array (FPGA) or other programmable logic devices, discrete gates or transistor logic devices, discrete hardware components.

Corresponding to the above learning method and learning apparatus, an embodiment of the present application further provides a computer readable storage medium. The computer readable storage medium is arranged in the robot. The computer readable storage medium stores a computer program thereon, and the computer program is executed by a processor, so as to cause the processor to implement the machine learning method described in the present application.

Specifically, the above learning machine method includes:

selecting a state from a set of states of a target object-searching scene as a first state, wherein the set of states is a set of states of the robot in the target object-searching scene;

obtaining a target optimal object-searching strategy whose initial state is the first state for searching for a target object, wherein the object-searching strategy includes: states successively experienced by the robot from the initial state of the object-searching strategy to a state that the target object is found, and an action performed by the robot in transitioning from each state to a next state;

performing strategy learning by taking the target optimal object-searching strategy as a learning target to obtain an object-searching strategy by which the robot searches for the target object in the target object-searching scene, and adding the obtained object-searching strategy into an object-searching strategy pool, wherein the obtained object-searching strategy is an object-searching strategy whose initial state is the first state and whose end state is a second state, wherein the second state is a state of the robot corresponding to a position of the target object in the target object-searching scene;

determining whether the obtained object-searching strategy is consistent with the target optimal object-searching strategy by comparing the obtained object-searching strategy and the target optimal object-searching strategy;

when the obtained object-searching strategy is consistent with the target optimal object-searching strategy, determining that the strategy learning in which the first state is taken as the initial state of the object-searching strategy is completed; and when the obtained object-searching strategy is not consistent with the target optimal object-searching strategy, returning to the step of selecting a state from a set of states of a target object-searching scene.

It should be noted that other embodiments of the machine learning method implemented by the processor when executing the program on the memory are the same as the embodiments of the machine learning method, which are not described again herein.

In the solution provided by the embodiment of the present application, by performing the program stored in the computer readable storage medium, the robot obtains a target optimal object-searching strategy for searching for a target object by taking one state in the set of states of the target object-searching scene as an initial state of the object-searching strategy and taking the first state as the initial state, and performs strategy learning by taking the target optimal object-searching strategy as the learning target to obtain the object-searching strategy by which the robot searches for the target object in the target object-searching scene. In this way, the robot can search for the target object in the target object-searching scene with the object-searching strategy obtained by the strategy learning, without the positioning apparatus in the robot, and thus will not be affected by the object-searching scene, thereby increasing the success probability of searching for an object.

Corresponding to the above object-searching method and object-searching apparatus, an embodiment of the present application further provides a computer readable storage medium. The computer readable storage medium is arranged in the robot. The computer readable storage medium stores a computer program thereon, and the computer program is executed by a processor, so as to cause the processor to implement the object-searching method described in the present application.

Specifically, the above object-searching method includes:

receiving an object-searching instruction for searching for a target object in a target object-searching scene;

obtaining a current state of the robot;

determining an action performed by the robot in transitioning from the current state to a next state, according to an object-searching strategy, including the current state, for searching for the target object in an object-searching strategy pool, wherein an object-searching strategy in the object-searching strategy pool is a strategy by which the robot searches for the target object in the target object-searching scene and which is obtained by performing strategy learning by taking an optimal object-searching strategy for searching for the target object as a learning target, and includes: states successively experienced by the robot from an initial state of the object-searching strategy to a state that the target object is found, and an action performed by the robot in transitioning from each state to a next state;

performing the determined action to realize a state transition, and determining whether the target object is found;

when the target object is not found, returning to the step of obtaining a current state of the robot until the target object is found.

It should be noted that other embodiments of the object-searching method implemented by the processor when executing the program on the memory are the same as the embodiments of the object-searching method, which are not described again herein.

As can be seen from above, in the solution provided by embodiment of the present application, by performing the computer program stored in the computer readable storage medium, the robot performs strategy learning by taking an optimal object-searching strategy for searching for the target object as a learning target, to obtain a strategy by which the robot searches for a target object in the target object-searching scene, and then the robot searches for the target object based on the above obtained object-searching strategies. In this way, the robot searches for the target object without the positioning apparatus in the robot, and thus will not be affected by the object-searching scene, increasing the success probability of searching for an object.

The embodiment of the present application further provides an executable program code, which is executed to implement any one of the machine learning methods applied to the robot.

The embodiment of the present application further provides an executable program code, which is executed to implement any one of the object-searching methods applied to the robot.

It should be noted that the relationship terms herein such as "first", "second", and the like are only used for distinguishing one entity or operation from another entity or operation, but do not necessarily require or imply that there is any actual relationship or order between these entities or operations. Moreover, the terms "include", "comprise" or any other variants thereof are intended to cover non-exclusive inclusions, so that processes, methods, articles or devices comprising a series of elements comprise not only those elements listed but also those not specifically listed or the elements intrinsic to these processes, methods, articles, or devices. Without further limitations, elements defined by the sentences "comprise(s) a/an . . . " or "include(s) a/an . . . " do not exclude that there are other identical elements in the processes, methods, articles, or devices which include these elements.

All of the embodiments in the description are described in a correlated manner, and identical or similar parts in various embodiments can refer to one another. In addition, the description for each embodiment focuses on the differences from other embodiments. In particular, the embodiments of the apparatus, the robot, the computer readable storage medium, the executable program code are described briefly, since they are substantially similar to the embodiment of the method, and the related contents can refer to the description of the embodiment of the method.

The embodiments described above are simply preferable embodiments of the present application, and are not intended to limit the scope of protection of the present application. Any modifications, alternatives, improvements, or the like within the spirit and principle of the present application shall be included within the scope of protection of the present application.

What is claimed is:

1. A machine learning method, which is applied to a robot, comprising:

selecting a state from a set of states of a target object-searching scene as a first state, wherein the set of states is a set of states of the robot in the target object-searching scene;

obtaining a target optimal object-searching strategy whose initial state is the first state for searching for a target object, wherein the object-searching strategy includes: states successively experienced by the robot from the initial state of the object-searching strategy to a state that the target object is found, and an action performed by the robot in transitioning from each state to a next state;

performing strategy learning by taking the target optimal object-searching strategy as a learning target to obtain an object-searching strategy by which the robot searches for the target object in the target object-searching scene, and adding the obtained object-searching strategy into an object-searching strategy pool, wherein the obtained object-searching strategy is an object-searching strategy whose initial state is the first state and whose end state is a second state, wherein the second state is a state of the robot corresponding to a position of the target object in the target object-searching scene;

determining whether the obtained object-searching strategy is consistent with the target optimal object-searching strategy by comparing the obtained object-searching strategy and the target optimal object-searching strategy;

when the obtained object-searching strategy is consistent with the target optimal object-searching strategy, determining that the strategy learning in which the first state is taken as the initial state of the object-searching strategy is completed; and when the obtained object-searching strategy is not consistent with the target optimal object-searching strategy, returning to the step of selecting a state from a set of states of a target object-searching scene, wherein performing strategy learning by taking the target optimal object-searching strategy as a learning target to obtain an object-searching strategy by which the robot searches for the target object in the target object-searching scene comprises:

determining a reward function in a reinforcement learning algorithm for strategy learning through a target type of object-searching strategy by taking the target optimal object-searching strategy as a learning target, wherein the target type of object-searching strategy is an object-searching strategy for searching for the target object in the target object-searching pool; and performing the strategy learning based on the reward function, to obtain an object-searching strategy that maximizes an output value of a value function in the reinforcement learning algorithm as an object-searching strategy by which the robot searches for the target object in the target object-searching scene;

and wherein determining a reward function in a reinforcement learning algorithm for strategy learning through a target type of object-searching strategy by taking the target optimal object-searching strategy as a learning target comprises:

determining a reward function R that maximizes a value of the following expression as the reward function in the reinforcement learning algorithm for strategy learning:

$$\text{maximise}\left(\sum_{i=1}^{k} p(V_{\pi_d}(S_0) - V_{\pi_i}(S_0))\right) \text{ where,}$$

$$V_\pi = \sum_{m}^{M} \gamma^t R(S_m, \pi(S_m))$$

$$p(x) = \begin{cases} x, & x \geq 0 \\ 2x, & x < 0 \end{cases}$$

k represents the number of object-searching strategies for searching for the target object included in the object-searching strategy pool, i represents an identifier of each object-searching strategy for searching for the target object in the object-searching strategy pool, $\pi i$ represents an object-searching strategy for searching for the target object, identified by i, in the object-searching strategy pool, πd represents the target optimal object-searching strategy, S0 represents the first state, $V\pi$ represents an output value of the value function of the reinforcement learning algorithm in the object-searching strategy π, M represents the number of states included in the object-searching strategy π, m represents an identifier of each of the states in the object-searching strategy π, t represents the number of state transitions in the object-searching strategy π, $\pi(S_m)$ represents an action performed by the robot in transitioning from a state Sm to a next state in the object-searching strategy π, γ is a preset coefficient, $0<\gamma<1$, and maximise( ) represents a function that returns the maximum value.

2. The method of claim 1, wherein performing the strategy learning based on the reward function to obtain an object-searching strategy that maximizes an output value of a value function in the reinforcement learning algorithm comprises:

obtaining, through learning, object-searching strategies whose initial states are the first state and whose end states are the second state in a preset state transition manner;

calculating, according to the following expression, an output value of the value function of the reinforcement learning algorithm in each of the obtained object-searching strategies:

$$V_\pi = \sum_{m}^{M} \gamma^t R_e(S_m, \pi(S_m))$$

where Re represents a reward function in the reinforcement learning algorithm; and determining an object-searching strategy corresponding to a maximum output value among the calculated output values as an object-searching strategy that maximizes an output value of the value function of the reinforcement learning algorithm.

3. The method of claim 1, wherein the next state of each state in the object-searching strategy and an action performed by the robot in transitioning from each state to the next state are determined by:

determining, according to probabilities of transitioning from a pre-transition state to other states pre-obtained in statistics, a post-transition state and an action performed by the robot in transitioning from the pre-transition state to the post-transition state, wherein the action belongs to a set of actions of the target object-searching scene, and the set of actions is performed by the robot in performing state transitions in the target object-searching scene.

4. The method of claim 3, wherein the states in the set of states are obtained by:

collecting an information sequence of the target object-searching scene, wherein the information sequence is composed of information elements comprising video frames and/or audio frames;

determining whether the number of information elements that have not been selected in the information sequence is greater than a preset number;

when the number of information elements that have not been selected in the information sequence is greater than the preset number, selecting the preset number of information elements from the information elements that have not been selected in the information sequence to generate one state of the robot in the target object-searching scene as a third state;

determining whether the third state exists in the set of states;

when the third state does not exist in the set of states, adding the third state into the set of states, and returning to the step of determining whether the number of information elements that have not been selected in the information sequence is greater than a preset number; and when the third state exists in the set of states, directly returning to the step of determining whether the number of information elements that have not been selected in the information sequence is greater than a preset number.

5. The method of claim 4, wherein the actions in the set of actions are obtained by:
   obtaining an action sequence corresponding to the information sequence, wherein the action sequence is composed of action elements, and the action elements in the action sequence correspond to the information elements in the information sequence one to one;
   determining whether the number of action elements that have not been selected in the action sequence is greater than the preset number;
   when the number of action elements that have not been selected in the action sequence is greater than the preset number, selecting the preset number of action elements from the action elements that have not been selected in the action sequence, to generate one action of the robot in the target object-searching scene as a first action;
   determining whether the first action exists in the set of actions;
   when the first action does not exist in the set of actions, adding the first action into the set of actions, and returning to the step of determining whether the number of action elements that have not been selected in the action sequence is greater than the preset number; and
   when the first action exists in the set of actions, directly returning to perform the step of determining whether the number of action elements that have not been selected in the action sequence is greater than the preset number.

6. A robot, comprising a processor and a memory, wherein the memory stores a computer program; and
   the processor, when executing the program stored on the memory, performs the method of claim 1.

7. A non-transitory computer readable storage medium, which is arranged in the robot, wherein a computer program is stored in the computer readable storage medium, and the computer program, when executed by a processor, so as to cause the processor to perform the method of claim 1.

8. An object-searching method, which is applied to a robot, comprising:
   receiving an object-searching instruction for searching for a target object in a target object-searching scene;
   obtaining a current state of the robot;
   determining an action performed by the robot in transitioning from the current state to a next state, according to an object-searching strategy, including the current state, for searching for the target object in an object-searching strategy pool, wherein an object-searching strategy in the object-searching strategy pool is a strategy by which the robot searches for the target object in the target object-searching scene and which is obtained by performing strategy learning by taking an optimal object-searching strategy for searching for the target object as a learning target, and the object-searching strategy includes: states successively experienced by the robot from an initial state of the object-searching strategy to a state that the target object is found, and an action performed by the robot in transitioning from each state to a next state;
   performing the determined action to realize a state transition, and determining whether the target object is found;
   when the target object is not found, returning to the step of obtaining a current state of the robot until the target object is found;
   wherein determining an action performed by the robot in transitioning from the current state to a next state, according to an object-searching strategy, including the current state, for searching for the target object in an object-searching strategy pool comprises:
   calculating, according to the following expression, output values of a value function of a preset reinforcement learning algorithm in object-searching strategies including the current state in the strategy pool:

$$V_\pi = \sum_{m=n}^{M} \gamma^x R_e(S_m, \pi(S_m))$$

where $V\pi$ represents an output value of the value function of the reinforcement learning algorithm in the object-searching strategy $\pi$, M represents the number of states included in the object-searching strategy $\pi$, m represents an identifier of each of the states in the object-searching strategy $\pi$, n represents an identifier of the current state in the object-searching strategy $\pi$, x represents the number of state transitions from the current state to a strategy end state in the object-searching strategy $\pi$, $\pi(Sm)$ represents an action performed by the robot in transitioning from a state Sm to a next state in the object-searching strategy $\pi$, $\gamma$ is a preset coefficient, $0<\gamma<1$, and Re represents a reward function in the reinforcement learning algorithm;
selecting an object-searching strategy corresponding to a maximum output value among the calculated output values as a target object-searching strategy; and
determining an action performed by the robot in transitioning from the current state to a next state in the target object-searching strategy.

9. The method of claim 8, wherein obtaining a current state of the robot comprises:
   collecting an information sequence of the target object-searching scene, wherein the information sequence is composed of information elements comprising video frames and/or audio frames;
   selecting a preset number of information elements from the information sequence;
   determining whether a state matching the selected information elements exists in a pre-obtained set of states of the target object-searching scene, wherein the set of states is a set of states of the robot in the target object-searching scene;
   when a state matching the selected information elements exists in the pre-obtained set of states, determining the state matching the selected information elements in the set of states as the current state of the robot.

10. A robot, comprising a processor and a memory, wherein
    the memory stores a computer program; and
    the processor, when executing the program stored on the memory, performs the method of claim 8.

11. A non-transitory computer readable storage medium, which is arranged in the robot, wherein a computer program is stored in the computer readable storage medium, and the computer program, when executed by a processor, so as to cause the processor to perform the method of claim 8.

* * * * *